United States Patent [19]
Bellware

[11] 3,716,887
[45] Feb. 20, 1973

[54] WINDSHIELD WIPER SYSTEM
[75] Inventor: James D. Bellware, Dayton, Ohio
[73] Assignee: General Motors Corporation, Detroit, Mich.
[22] Filed: Aug. 26, 1971
[21] Appl. No.: 175,176

[52] U.S. Cl. ............15/250.17, 74/75, 74/600
[51] Int. Cl. .............................................B60s 1/24
[58] Field of Search.........15/250.16, 250.17, 250.19; 74/70, 75, 599, 600, 601

[56] References Cited

UNITED STATES PATENTS

| 2,753,721 | 7/1956 | Latta | 15/250.17 X |
| 2,949,035 | 8/1960 | Harrison | 74/600 X |

FOREIGN PATENTS OR APPLICATIONS

| 1,055,980 | 4/1959 | Germany | 15/250.17 |

Primary Examiner—Peter Feldman
Attorney—W. E. Finken et al.

[57] ABSTRACT

In a preferred form, this disclosure relates to a windshield wiping apparatus having a pair of oscillatable windshield wipers, a pair of oscillatable drive pivots to which the wipers are drivingly connected, a drive mechanism having a rotatable output shaft and a yieldable force transmitting means for connecting the output shaft to a crank arm and a drive transmission or linkage operatively connected with the crank arm and the drive pivot for oscillating the same to oscillate the wipers. The drive mechanism is operable to rotate the crank arm through the yieldable force transmitting means through a first orbit of a given radius during running operation and is operable to eccentrically move the rotatable output shaft to increase the throw of the crank arm to effect movement of the wipers from their inboard position toward a depressed park position when wiper operation is being terminated. The yieldable force transmitting means is operable to allow the crank arm to remain stationary and the output shaft to be eccentrically shifted and trip a park switch upon the wipers encountering an obstruction which creates a back force in excess of a predetermined magnitude upon being moved from their inboard position toward their park position.

2 Claims, 7 Drawing Figures

PATENTED FEB 20 1973

INVENTOR.
James D. Bellware
BY
W.A. Schuetz
ATTORNEY

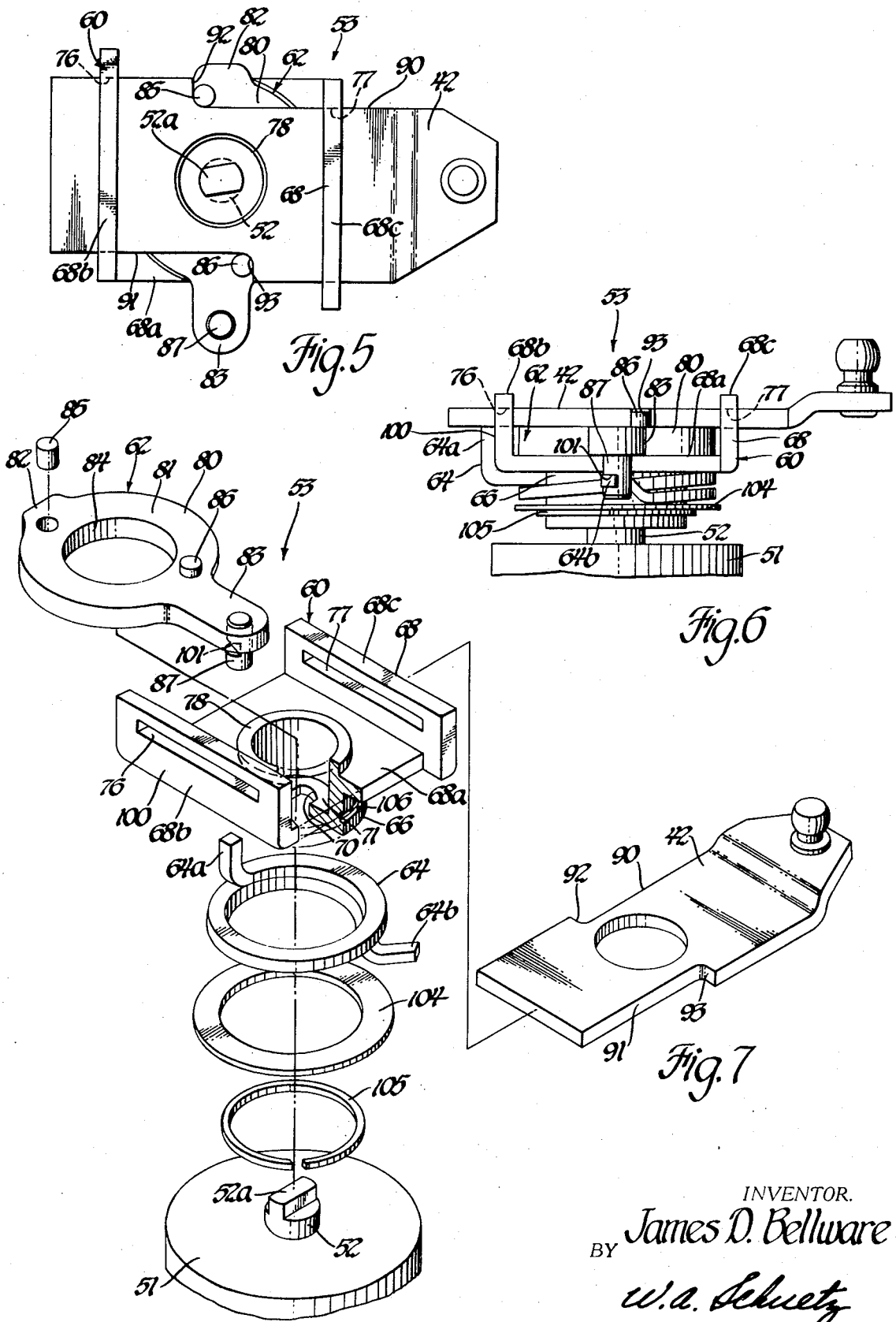

WINDSHIELD WIPER SYSTEM

The present invention broadly relates to a windshield wiping apparatus, and in particular to the windshield wiping apparatus having a pair of windshield wipers which are adapted to be oscillated across the outer surface of a windshield between inboard and outboard positions during running operation and which are adapted to be moved to a depressed park position adjacent the lower edge of the windshield when wiper operation is being terminated.

Depressed park windshield wiper systems usually include a pair of spaced drive pivots rotatably supported by the body structure of the vehicle and to which windshield wipers are mounted, a drive mechanism including a rotary output shaft and a crank arm attached to the output shaft, and a drive transmission or linkage connected with the drive pivots and the crank arm for reciprocating the windshield wipers between inboard and outboard positions in response to the rotation of the crank arm. The drive mechanism of such systems have also included a means for eccentrically shifting the output shaft to increase the throw of the crank arm to effect movement of the wipers from their inboard position to a depressed park position adjacent the lower edge of the windshield when wiper operation is being terminated. Cam operated park switches are generally provided for de-energizing the drive mechanism upon the wipers reaching their depressed park position.

These known systems have also included a means for deenergizing the wiper motor upon the wipers engaging an obstruction on the windshield which creates a back force in excess of a predetermined magnitude as the wipers are being moved from their inboard position toward their park position. These means have included such things as the yieldable link or linkage and slip clutches which respectively yield and slip to allow the motor to rotate until an associated park switch is opened, or thermal overload switches to effect de-energization of the motor when an excessive load is placed on the wiper system. For examples, see U.S. Pat. Nos. 3,336,619, 2,538,344, 2,795,809 and 3,298,307.

In accordance with the provisions of the present invention, a novel yieldable force transmitting means operatively connected with the output shaft of the drive mechanism and the rotatable crank arm is provided to accomplish the same end result. The yieldable force transmitting means is of a construction such that should the wipers encounter an obstruction upon their being moved from their inboard position toward their park position which creates a back force in excess of a predetermined magnitude, the yieldable force transmitting means will yield to allow the motor to continue to eccentrically shift the output shaft while the crank arm remains more or less stationary and trip a park switch to de-energize the motor without causing any damage to the windshield wiper system.

Accordingly, an important object of the present invention is to provide a new and improved depressed park windshield wiper system which includes a yieldable force transmitting means interposed between the output shaft of the drive mechanism and the crank arm and which is yieldable to allow the crank arm to remain more or less stationary and the output shaft to be eccentrically shifted upon the wipers encountering a force in excess of a predetermined magnitude as they are being moved toward their park position to allow the park switch to be tripped or opened and de-energize the wiper motor.

Another object of the present invention is to provide a new and improved depressed park windshield wiper system, as defined in the next preceding object, and wherein the yieldable force transmitting means includes a support member which is drivingly connected to the output shaft of the drive mechanism and which slidably supports the crank arm for movement linearly relative thereto, a lever and pin assembly rotatably supported by the support member and which is engageable with abutment surfaces on the crank arm located on opposite sides of the rotatable output shaft and a torsion spring having one end in engagement with the support member and the other end in engagement with the lever for biasing the latter into engagement with said crank arm and to biasingly hold the crank arm in a normal position relative to the support member, and in which the torsion spring has a biasing force such that it prevents relative movement between the support member and the crank arm during normal operation, but allows the crank arm to remain more or less stationary and the support member to move linearly relative thereto and in opposition to the biasing force of the torsion spring upon the wipers encountering an obstruction which creates a back force on the wiper system in excess of a predetermined magnitude when the wipers are being moved toward their park position to as to enable the drive mechanism to continue to eccentrically shift the output shaft and thereby trip a park switch to de-energize the wiper drive mechanism.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 5 is an enlarged elevational view of part of the windshield wiper apparatus of the present invention and looking in the direction of the arrow 5—5 of FIG. 3;

FIG. 6 is a side elevational view of that part of the windshield wiper apparatus shown in FIG. 5; and FIG. 7 is an exploded view of that part of the windshield wiper apparatus shown in FIG. 5.

Figure 1:
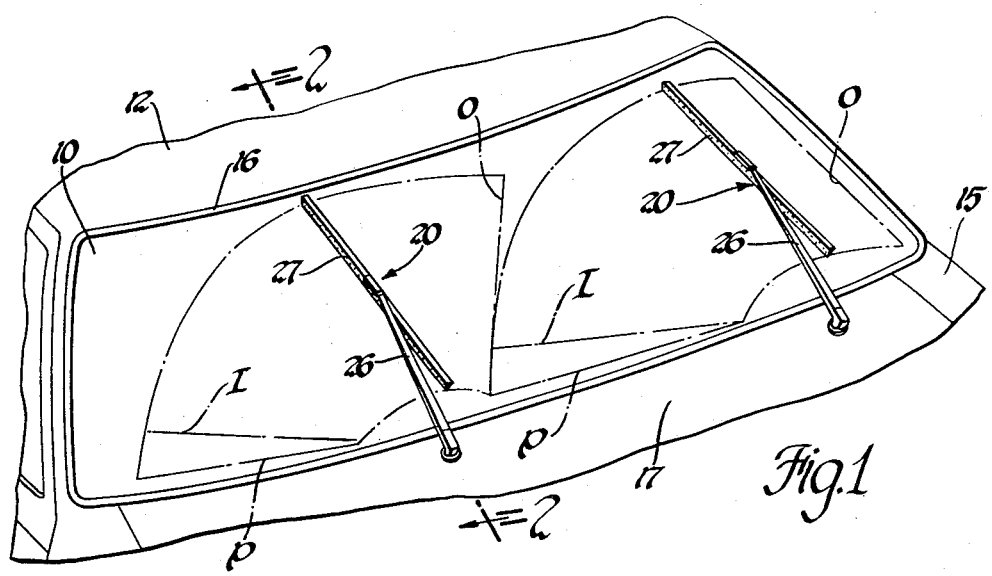
FIG. 1 is a fragmentary perspective view of an automotive vehicle embodying the novel windshield wiper apparatus of the present invention.

The present invention provides a novel windshield wiper apparatus or system A for wiping a windshield 10 of an automotive vehicle 12. The windshield 10 is supported by a suitable body structure 25 of the vehicle and is surrounded by a reveal molding 16. Extending forwardly from the lower end of the windshield 10 is a cowl 17.

The windshield wiper system A includes a pair of spaced windshield wipers 20 which are adapted to be oscillated in tandem across the outer surface of the windshield between inboard and outboard positions, designated by the letters I and O respectively, during running operation of the wipers 20 and to a depressed park position P adjacent the reveal molding 16 at the lower edge of the windshield when wiper operation is being terminated. It should be noted at this point that the present invention is equally usable with a slot concealed, depressed park windshield wiper system in which the rearward edge of the hood or cowl is spaced forwardly from the windshield to provide an elongated slot extending transversely of the windshield 10. In this latter system the windshield wipers when in their park position P will be located within the slot so as to be concealed from view.

Figure 2:
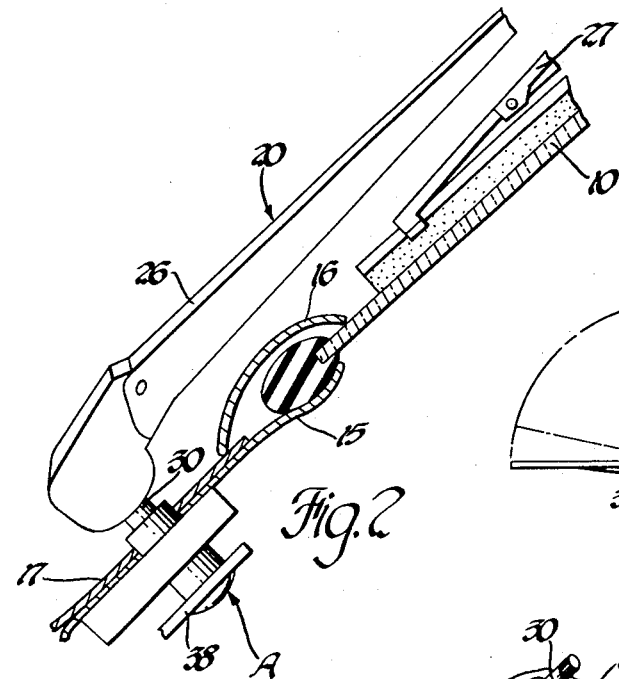
FIG. 2 is an enlarged fragmentary sectional view taken approximately along line 2—2 of FIG. 1.
Figure 3:
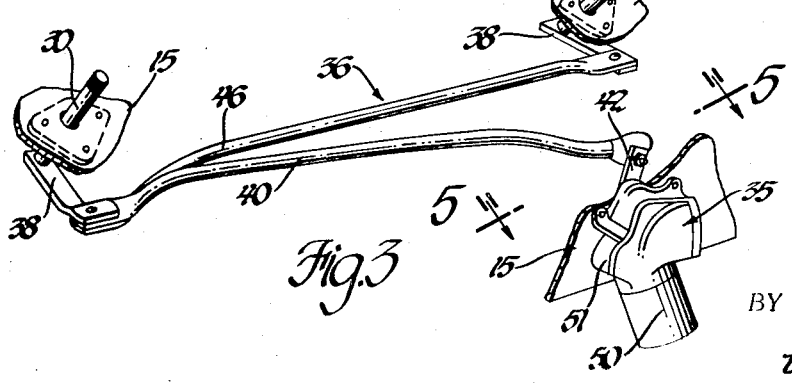
FIG. 3 is a fragmentary perspective view of part of the windshield wiper apparatus of the present invention.

The windshield wipers 20 include a conventional wiper arm 26 having spring hinge connected inner and outer wiper arm sections fur urging a conventional or suitable wiper blade assembly 27 into engagement with the outer surface of the windshield 10. The inner end section of the windshield wiper arms 26 are suitably secured to rotatable drive pivots 30 (see FIGS. 2 and 3) rotatably supported by the body structure 15 of the vehicle 12.

The drive pivots 30 are adapted to be rotated to oscillate the wipers between their inboard and outboard positions I and O during running operation by a drive mechanism 35 which is operatively connected therewith via a drive transmission or linkage arrangement 36. The drive transmission comprises a pair of crank arms 28 having one end drivingly connected to one of the drive pivots 30, a drive link 40 having one end connected via a ball and socket joint to a crank arm 42 of the drive mechanism 35 and its other end connected to the leftmost crank arms 38 and a cross or follower link 46 having one end connected via a ball and socket joint to the leftmost crank arm 38 and its lower end connected via a ball and socket joint to the rightmost crank arm 38.

Figure 4:
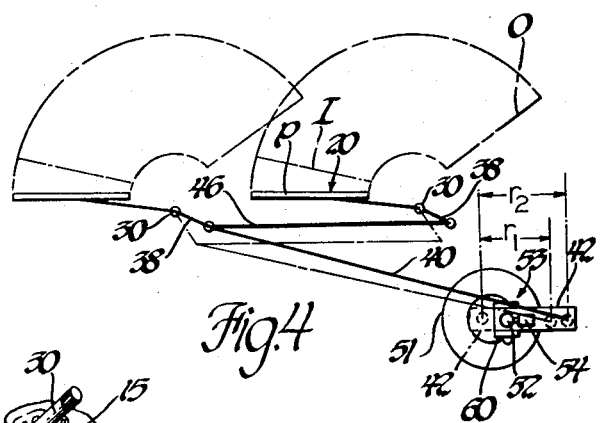
FIG. 4 is a schematic view of the windshield wiper apparatus of the present invention.

The drive mechanism 35 comprises an electric motor 50 and gear reduction unit 51 having an output shaft 52 which is drivingly connected with one end of the crank arm 42 via a yieldable force transmitting means 53 (shown in FIGS. 5-7), and in a manner to be hereinafter more fully described. The drive mechanism 35 could be of any suitable or conventional construction in which the throw of the crank arm 42 is increased by eccentrically shifting the rotatable output shaft 52 to move the wipers to a depressed park position P when wiper operation is being terminated. Since the drive mechanism 35 does not, per se, form a part of the present invention, it will not be described in detail. Suffice it to say that it is preferably of the type shown and described in U.S. Pat. No. 3,253,206, and assigned to the same assignee as the present invention. In the drive mechanism of the aforementioned patent, the output shaft is coupled to a gear reduction unit 51 to rotate the crank arm 42 through a given radius $r_1$ during running operation (see FIG. 4). When wiper operation is being terminated and the wipers 20 reach their inboard position I, the output shaft 52 is uncoupled from the gear reduction unit 51 and eccentrically moved or shifted from the dotted line position to the solid line position, as shown in FIG. 4, to increase the radius or throw of the crank arm 42 to $r_2$ to move the wipers from their inboard position I to their park position P. During this eccentric shifting of the output shaft 52, the crank arm 42 more or less remains in the disposition shown in FIG. 4 and when shifted to increase the radius of the crank arm to $r_2$ causes a conventional park switch 54, shown schematically in FIG. 4, to be opened or tripped to de-energize the wiper motor.

When wiper operation is initiated the crank arm 42 is eccentrically moved to decrease the radius or throw of the crank arm 42 from radius $r_2$ to radius $r_1$ to effect movement of the wipers 20 from their park position P to their inboard position I and then the output shaft 52 is automatically coupled to the gear reduction unit 51 to rotate the output shaft 52 therewith and effect rotation of the crank arm 42 about the radius $r_1$ during running operation to move the wipers between their inboard and outboard positions I and O.

In accordance with the provisions of the present invention, a novel yieldable force transmitting means 53 is interconnected with the crank arm 42 and the output shaft 52 for transmitting the rotational force of the output shaft to the crank arm 42. The yieldable force transmitting means 53 is constructed and arranged such that it will yield when a back force in excess of a predetermined magnitude is exerted on the wiper system due to the wipers 20 encountering an obstruction as they are being moved from their inboard position I toward their park position P so as to allow the crank arm 42 to remain more or less stationary and the output shaft 52 to continue to be eccentrically shifted and moved relative to the crank arm 42 until it trips the park switch 54.

The yieldable force transmitting means 53 broadly comprises a support member 60 which is drivingly connected to the rotatable output shaft 52 and which slidably supports the crank arm 42 for linear movement relative thereto, a lever and pin assembly 62 which is pivotally supported by the support member 60 and which is engageable with the crank arm 42 at locations located on the opposite sides of the rotatable output shaft 52 and a torsion spring 64 having one end in engagement with the lever and pin assembly 62 and its other end in engagement with the support member 60 and which biasingly holds the crank arm 42 in a normal position relative to the support member, as shown in FIG. 5. The biasing force of the torsion spring 64 is such that it prevents relative movement between the crank arm 42 and the support member 60 during normal operation of the wipers, but allows the crank arm 42 to remain more or less stationary and the support member to move linearly relative thereto upon the wipers encountering an obstruction which creates a back force in excess of a predetermined magnitude as they are being moved from their inboard position I toward their park position P, or vice versa.

The support member 60 is of a one-piece metal construction and comprises an annular downwardly extending hub portion 66 and an upper U-shaped portion 68. The hub portion 66 is drivingly connected to the output shaft 52. To this end, the hub portion 66 has a non-circular opening 70 in its bottom wall 71 and the drive shaft 52 has a non-circular upper end 52a which is received within the opening 70 in the hub portion 66. The drive shaft 52 can be secured to the hub portion 66 in any suitable manner, such as by peening over its upper end. The U-shaped portion 68 has a planar bottom 68a and a pair of upwardly extending legs 68b and 68c. The legs 68b and 68c have aligned elongated slots 76 and 77 therein, respectively. Integral with the bottom 68a and projecting upwardly therefrom is an annular ring 78.

The support member 60 rotatably supports the lever and pin assembly 62. The lever and pin assembly 62 comprises a lever 80 having an annular portion 81 defining a circular opening 84 and a pair of flange portions 82 and 83 extending radially therefrom at diametral opposite locations. The flange 83 is of a greater length than the flange 82. The lever 80 is adapted to be rotatably supported for pivotal movement about the annular ring 78 which is received within the opening 84 in the lever 80. The lever 80 also carries a pair of upwardly extending pins 85 and 86 at diametral opposite locations and the flange 83 adjacent its outer end carries a downwardly extending pin 87.

The crank arm 52 comprises a generally flat steel member which is slidably received within the slots 76 and 77 of the support member 60 and overlies the lever 80 to retain the same on the ring 78. The crank arm 42 has a pair of recesses 90 and 91 extending from its opposite ends and which define a pair of transverse abutment surfaces 92 and 93 on opposite sides of or at opposite diametral locations of the output shaft 52. The pins 85 and 86 on the lever 80 are adapted to engage the abutments 92 and 93, respectively.

The crank arm 42 is biasingly held in a normal position relative to the support member 60, as shown in FIG. 5, by the torsion spring 64. The torsion spring 64 is here shown as having approximately one and one-half curls and is of a square cross-sectional shape. The torsion spring 64 extends around the hub portion 66 of the support member 60 and has one end 64a bent upwardly and in engagement with a side 100 of the support member 60 and its other end 64b bent outwardly and slightly upwardly and which is received within a slot 101 in the downwardly extending pin 87 carried by the flange 83 of the lever 80. The torsion spring 64 is held on the hub portion 66 by a washer 104 which is slidably received on the hub portion 66 and which engages the bottom side of the torsion spring 64 and a C-ring 105 which engages the lower side of the washer 104 and is received within an annular recess 106 on the hub portion 66.

The torsion spring 64 serves to bias the lever 80 in a counterclockwise direction, as viewed in FIG. 5, and to maintain the pins 85 and 86 in engagement with the abutment surfaces 92 and 93 of the crank arm 42. Since the pins 85 and 86 are located on diametral opposite locations with respect to the output shaft 52 and since the crank arm 42 is slidably supported by the legs 68b and 68c of the support member 60, the biasing forces exerted on the crank arm 42 to move the latter right or left relative to the support member 80 cancel out and thus, the torsion spring serves to bias the crank arm 42 to a normal position relative to the support member 60, as shown in FIG. 5. The biasing force of the torsion spring 64 is such that during normal wiper operation, no movement of the support member 60 relative to the crank arm 42 takes place. Moreover, since the crank arm 42 is received within the slots 76 and 77 of the legs 68b and 68c of the support member 60, rotary movement is imparted to the crank arm 42 in response to rotation of the support member 60.

Referring to the schematic view of FIG. 4, it can be seen that as the wipers 20 are moved from their inboard position I toward their park position P, the output shaft 52 and hence the support member 60 and the crank arm 42 are moved from their phantom line position toward their solid line position. If one or both of the wipers 20 were to encounter an obstruction upon being moved from their inboard position I toward their park position P such that further movement of the wipers 20 cannot take place and hence, the drive link 40 and the crank arm 42 cannot be moved toward the right, the support member 60 will continue to be moved toward the right by the shaft 52 while the crank arm 42 remains relatively stationary. This movement continues until the output shaft 52 trips the park switch 54 to de-energize the wiper motor. As the support member 60 and output shaft 52 are moved toward the right, the support member 60 will slide relative to the crank arm 42, which remains more or less stationary, and move in opposition to the biasing force of the torsion spring 64. When the support plate 60 is moved toward the right relative to the crank arm 42, it causes the lever 80 to rotate in a clockwise direction from its position shown in FIG. 5 due to the engagement between the pin 86 and the abutment surface 93 on the crank arm 42 and hence, causes the torsion spring 64 to be wound in a clockwise direction. The yieldable force transmitting means 53 thus allows the drive mechanism to eccentrically shift the output shaft 52 and the support member 60 to enable the park switch 54 to be tripped even though the wipers 20 encounter an obstruction and cannot be moved to their park position P.

Likewise, should an obstruction be encountered by the wipers 20 as they are being moved from their park position P toward their inboard position I upon initiation of wiper operation, the support member 60 will be caused to be shifted toward the left relative to the crank arm 42. This movement may be sufficient to enable the wipers to move or break loose from the obstruction and, if not, a conventional overload circuit breaker (not shown) within the wiper motor 50 would open to de-energize the motor 50 if the obstruction continued to exist. Movement of the support member 60 toward the left relative to the crank arm 42, causes the lever member 80 to pivot in a clockwise direction due to the engagement between the pin 85 and the abutment surface 92 on the crank arm 42 and hence, causes, due to the engagement between the support member 60 and the end 64a of the torsion spring, the torsion spring 64 to be wound more tightly about the hub portion 66.

From the foregoing, it should be apparent that the yieldable force transmitting means 53 will prevent damage to the windshield wiper system in the event that an obstruction is encountered by the wipers which prevent further movement thereof as they are being moved toward and from their park position. The yieldable force transmitting means 53 in effect allows the crank arm 42 to remain more or less stationary while the drive mechanism continues to eccentrically shift the output shaft and the support member 60.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. In a windshield wiping apparatus for an automotive vehicle comprising a pair of windshield wipers which are adapted to be oscillated across the windshield between inboard and outboard positions during running operation and moved to a depressed park position spaced from the inboard position when wiper operations is being terminated, a pair of oscillatable drive pivots to which the wipers are drivingly connected, a drive mechanism having a rotatable output shaft and a crank arm operatively connected with the output shaft, a drive transmission operatively connected to said crank arm and said drive pivots for oscillating said wipers in response to said drive mechanism rotating said crank arm, and wherein said drive mechanism is operable to rotate said crank arm through a first orbit of a given radius during running operation and being operable to eccentrically shift the output to increase the throw of the crank arm to effect movement of the wipers from their inboard position toward their park position when wiper operation is being terminated and to open a park switch operatively associated therewith for effecting de-energization of the drive mechanism when the latter has moved the wipers to their park position, the improvement comprising: a yieldable force transmitting means operatively connected with said rotatable output shaft and said crank arm for transmitting the force from said output shaft to said crank arm, said yieldable force transmitting means comprising a support member drivingly connected with said rotatable output shaft and slidably supporting said crank arm for relative linear movement relative thereto, a lever assembly pivotally supported by said support member and engageable with portions of said crank arm located on opposite sides of said rotatable output shaft, and a torsion spring having one end connected with said support member and its other end connected with said lever for biasing said lever assembly into engagement with said crank arm to biasingly hold said crank arm in the normal position relative to said support member, said torsion spring having a biasing force such that it prevents relative movement between the support member and the crank arm during normal operation of the wipers, said support member being linearly movable relative to the crank arm and in opposition to the biasing force of said torsion spring upon said wipers encountering an obstruction which creates a back force on the wiper system in excess of a predetermined magnitude when the wipers are being moved from their inboard position toward their park position so as to enable the crank arm to remain generally stationary and the drive mechanism to continue to shift the output shaft and support member to open the park switch to de-energize the drive mechanism.

2. In a windshield wiping apparatus for an automotive vehicle comprising a pair of windshield wipers which are adapted to be oscillated across the windshield between inboard and outboard positions during running operation and moved to a depressed park position spaced from the inboard position when wiper operation is being terminated, a pair of oscillatable drive pivots to which the wipers are drivingly connected, a drive mechanism having a rotatable output shaft and a crank arm operatively connected with said output shaft, a drive transmission operatively connected with said crank arm and said drive pivots for oscillating said wipers in response to said drive mechanism rotating said crank arm, said drive mechanism being operable to rotate said output shaft and said crank arm through a first orbit of a given radius during running operation and being operable to interrupt the driving connection therebetween upon the wipers reaching their inboard position and eccentrically move the output shaft to increase the throw of the crank arm to effect movement of the wipers from their inboard position toward their park position and to open a park switch upon reaching their park position to deenergize the drive mechanism when wiper operation is being terminated, the improvement comprising: a yieldable force transmitting means operatively connected with said rotatable output shaft and said crank arm for transmitting the force between the output shaft to the crank arm, said yieldable force transmitting means comprising a generally U-shaped support member drivingly connected to the rotatable output shaft and having a pair of spaced parallel legs, said legs having aligned slots therein, said crank arm being received within said slots in said legs and being slidably supported by said support member for linear movement relative thereto, said crank arm having a pair of opposed abutment surfaces located on opposite sides of the axis of the crank arm, a lever and pin assembly rotatably supported by said support member and having a pair of pins for engaging respective ones of said abutment surfaces on the crank arm, a torsion spring having one end connected with said lever and the other end engageable with said support member for biasing said lever and said pins into engagement with the abutment surfaces on the crank arm to biasingly hold the crank arm in a normal position relative to the support member, said torsion spring having a biasing force such that it prevents relative movement between the crank arm and the support member during normal operation of the wipers, said support member being linearly movable relative to said crank arm and in opposition to the biasing force of the torsion spring upon the wipers encountering an obstruction which creates a back force on the wiper system in excess of a predetermined magnitude when the wipers are being moved from their inboard position toward their park position so as to enable the crank arm to remain generally stationary and the drive mechanism to continue to shift the output shaft and support member to open the park switch and de-energize the drive mechanism.

* * * * *